United States Patent [19]

Richards

[11] Patent Number: 5,421,549
[45] Date of Patent: Jun. 6, 1995

[54] SUPPORT STAND FOR OPTICAL EQUIPMENT

[76] Inventor: John W. Richards, 4093 Laurel Springs Way, Smyrna, Ga. 30082

[21] Appl. No.: 174,313

[22] Filed: Dec. 30, 1993

[51] Int. Cl.[6] ............................................. F16M 11/32
[52] U.S. Cl. ................................... 248/163.2; 248/171; 354/81; 354/293
[58] Field of Search ................. 248/163.1, 166, 167, 248/170, 171, 188.6, 169, 173, 163.2; 354/293, 81

[56] References Cited

U.S. PATENT DOCUMENTS

| | | | |
|---|---|---|---|
| D. 257,259 | 10/1980 | Shiraishi | D16/44 |
| 2,282,285 | 5/1942 | Olson | 248/188.6 X |
| 2,374,021 | 4/1945 | Korling | 248/171 X |
| 3,064,932 | 11/1962 | Holderman | 248/171 |
| 3,632,073 | 1/1972 | Nakatani | 248/169 |
| 3,836,986 | 9/1974 | Kawazoe | 354/293 |
| 3,908,945 | 9/1975 | Shapiro et al. | 248/165 |
| 4,097,013 | 6/1978 | Broome | 248/171 |
| 4,121,799 | 10/1978 | Michio | 248/171 |
| 4,317,553 | 3/1982 | Meinunger | 248/171 |
| 4,324,477 | 4/1982 | Miyazaki | 354/293 |
| 4,492,354 | 1/1985 | Rice | 248/163.1 |
| 4,666,112 | 5/1987 | Jaumann | 248/169 |
| 5,062,606 | 11/1991 | Hoshino | 248/171 |
| 5,137,236 | 8/1992 | Burns | 248/171 |
| 5,165,635 | 5/1992 | Hoshino | 248/169 |
| 5,267,712 | 12/1993 | Shen | 354/81 X |

*Primary Examiner*—Ramon O. Ramirez
*Attorney, Agent, or Firm*—Hopkins & Thomas

[57] ABSTRACT

A portable support stand for camera unipods and camera equipment. The support stand includes a cylindrical body adapted to receive and contain a camera unipod stand or the like and to which a camera can be mounted. A series of legs are hingedly attached to a pair of collars slidably mounted about the cylindrical body. As the collars slide along the body of the support stand, the legs of the support stand are extended and retracted between a compact non-operative position and a spread apart operative position.

13 Claims, 3 Drawing Sheets

SUPPORT STAND FOR OPTICAL EQUIPMENT

FIELD OF THE INVENTION

The present invention generally relates to a support stand for optical equipment such as a camera unipod. More particularly, the present invention relates to a compact camera unipod support stand having a series of automatically extensible legs and which is adapted to receive and support a camera unipod in a secure, stable alignment.

BACKGROUND OF THE INVENTION

Photographs provide one of the most tangible visual records of places, events, and people. Accordingly, interest in photographs and photography has greatly increased, especially in recent times, which have seen an explosive growth in the popularity of photography both as a profession and as a hobby for an increasing number of amateur photographers. As interest in photography has increased, cameras and camera equipment in general have become increasingly sophisticated. The focus has been to make cameras easier to use by even the most inexperienced photographers while still providing excellent quality photographs. Many cameras today have computer control and automatic focusing features to take the guesswork out of taking pictures, especially for the novice photographer.

One problem that has always plagued photographers, and a problem which still exists despite the technological advances in autofocusing and control of cameras, is the problem of the photographer maintaining the stability of the camera while taking photographs. Most high quality cameras are somewhat heavy and are often bulky, such that even the steadiest photographer can have difficulties in keeping the camera stable. Movement of the camera, even inadvertently, tends to effect a blurring of the picture being taken, often causing the picture taken to be of poor quality or often useless.

The traditional solution to this stability problem has been to use a camera stand such as a tripod on which the camera is mounted to stabilize the camera and to minimize movement. Conventional camera tripods generally include a head to which a camera is mountable and a series of three telescoping legs that support the head and that fold together when not in use. An example of such a conventional camera tripod is shown in U.S. Pat. No. 4,666,112. The problem with such conventional tripods is that they generally are bulky and cannot be retracted into a tightly compacted configuration for ease of transport and storage. Additionally, such conventional tripods are not easy to use as it is often difficult to adjust all three legs quickly and easily to the proper length needed to mount the camera at a desired elevation. If the legs are not all fixed at approximately an equivalent length, the tripod stand tends to become imbalanced or tilted from the vertical, diminishing the stability of the stand as well as the picture composition.

Attempts have been made to provide tripod camera stands having legs of a fixed length which are retractable into a tight, compact configuration for easier storage and transport. An example of such a compact tripod is shown in U.S. Pat. No. 3,632,073. However, a significant drawback of such compact tripods is that to enable the tripod to retract into a compact configuration, the tripod is necessarily limited in height, which limits its utility to use on platforms, tables, etc., in order to support the camera at a desired elevation.

One of the most popular types of camera stands introduced in the past several years is the "camera unipod". The unipod is a single leg structure formed from a series of telescoping sleeves or rods, which enable the unipod to be retracted into a compact configuration for easy storage and transport. A camera mount is attached at one end of the unipod, with a footpad mounted at the opposite end. An example of such a camera stand is shown in U.S. Pat. No. Des. 257,259. The unipod is designed to be an adjustable and easy to use camera support that is retractable into a compact configuration for ease of storage and transport. The problem with the unipod is, however, that since the unipod only has one leg for support, it is much less stable than conventional tripods, and must be held by the user. Such a lack of stability is especially a problem when used on uneven or broken ground and the unipod tends to lean or move with the movement of the photographer. There are, moreover, no currently available means for supporting and stabilizing unipods, and conventional tripod camera stands are not adaptable to receive and stabilize a unipod.

Accordingly, it can be seen that it would be desirable to provide a compact, stable camera stand that is able to receive and maintain optical equipment such as a camera unipod in a stable, supported arrangement for taking pictures.

SUMMARY OF THE INVENTION

Briefly described, the present invention comprises a support stand for supporting optical equipment such as a camera unipod and other photographic equipment including cameras. The support stand includes a stand body generally formed from a substantially cylindrical tube or pipe and having open upper and lower ends. The stand body further includes a cylindrical inner wall defining a bore through the stand body. A collar means is mounted along the length of the stand body between the upper and lower ends thereof. The collar means typically comprises a first or upper collar and a second or lower collar slidably mounted about the stand body and movable along the length thereof.

A series of legs are mounted to the collars and are movable between a spread apart operative position for supporting the stand body on a surface and a folded non-operative alignment lying substantially flat against the stand body. The legs are each attached at their upper ends to the lower collar by hinges to enable the upper ends of the legs to pivot with respect to the lower collar. The upper collar is likewise attached to the legs along the length of the legs by a series of struts. The struts are each pivotally attached at one end to the upper collar and at their other ends to the legs at an intermediate portion along their length.

A compression spring is mounted between the upper and lower collars and attached to each collar. The compression spring functions as a means for moving or biasing the collars along the length of the stand body. As the spring decompresses, it urges the upper and lower collars downwardly along the length of the stand body. Such movement of the collars along the stand body causes the legs to move from their folded non-operative position into their spread apart operative position. The struts connecting the top surface of each leg to the upper collar help maintain the necessary spring pressure between the two collars to enable a spring loaded extension of the collar means along the length of the stand body.

A locking means is mounted adjacent the upper end of the stand body, and includes a latch tab that is insertable into a slot formed in the inner wall of the upper collar. As a result, as the collars are pulled upwardly along the length of the stand body, causing the legs to retract toward their folded non-operative position, the latch tab is engaged and received within the slot formed in the upper collar. The engagement of the upper collar by the latch tab secures the collars in a spring loaded (compressed) position adjacent the upper end of the stand body. A release button is mounted in the stand body at the upper end thereof, connected to the latch tab. As the release button is engaged, the latch tab is disengaged from its engagement with the upper collar. This enables both collars to be urged downwardly along the length of the stand body by the force of the spring as it is decompressed. The support stand is thus provided with an automatic spring loaded leg extension.

For use in supporting a camera unipod, the leg of the camera unipod is received through the open upper end into the bore of the stand body. A hinged clip or yoke is mounted within the stand body adjacent the open upper end thereof. The yoke generally comprises a semi-cylindrical or Y-shaped strip of metal such as spring steel or other resilient material that is hingedly attached to the inner side wall of the stand body at the upper end thereof. The yoke is pivotable into and out of the bore of the stand body to facilitate the insertion of the unipod leg therein. Set screws are provided at spaced locations along the length of the stand body for securing the unipod leg within the bore of the stand body.

Additionally, it is also possible to use the present invention as a support device for a camera by the insertion of a mounting bracket or cap into the upper end of the stand body. The cap typically is a substantially cylindrical section of tubing or pipe formed from a plastic material or other type of substantially rigid material. The cap includes a threaded portion adapted to threadably engage the inner side wall of the stand body to mount the cap over the upper end of the stand body. The cap further includes an upstanding mounting post attached to its upper surface for mounting and supporting a camera thereon.

It is therefore an object of this invention to provide a compact camera support stand.

Another object of this invention is to provide a camera support stand that is quickly and easily foldable into a compact arrangement for ease of storage and transport.

A further object of this invention is to provide a support stand for supporting a camera unipod to provide the camera unipod with increased stability and support for taking photographs.

Still a further object of this invention is to provide a support stand, having a series of legs which are automatically extendable to a spread apart operative configuration.

Other objects, advantages, and features of the present invention will become evident upon review of the following detailed description taken in conjunction with the accompanying drawings.

DETAILED DESCRIPTION

Figure 1:
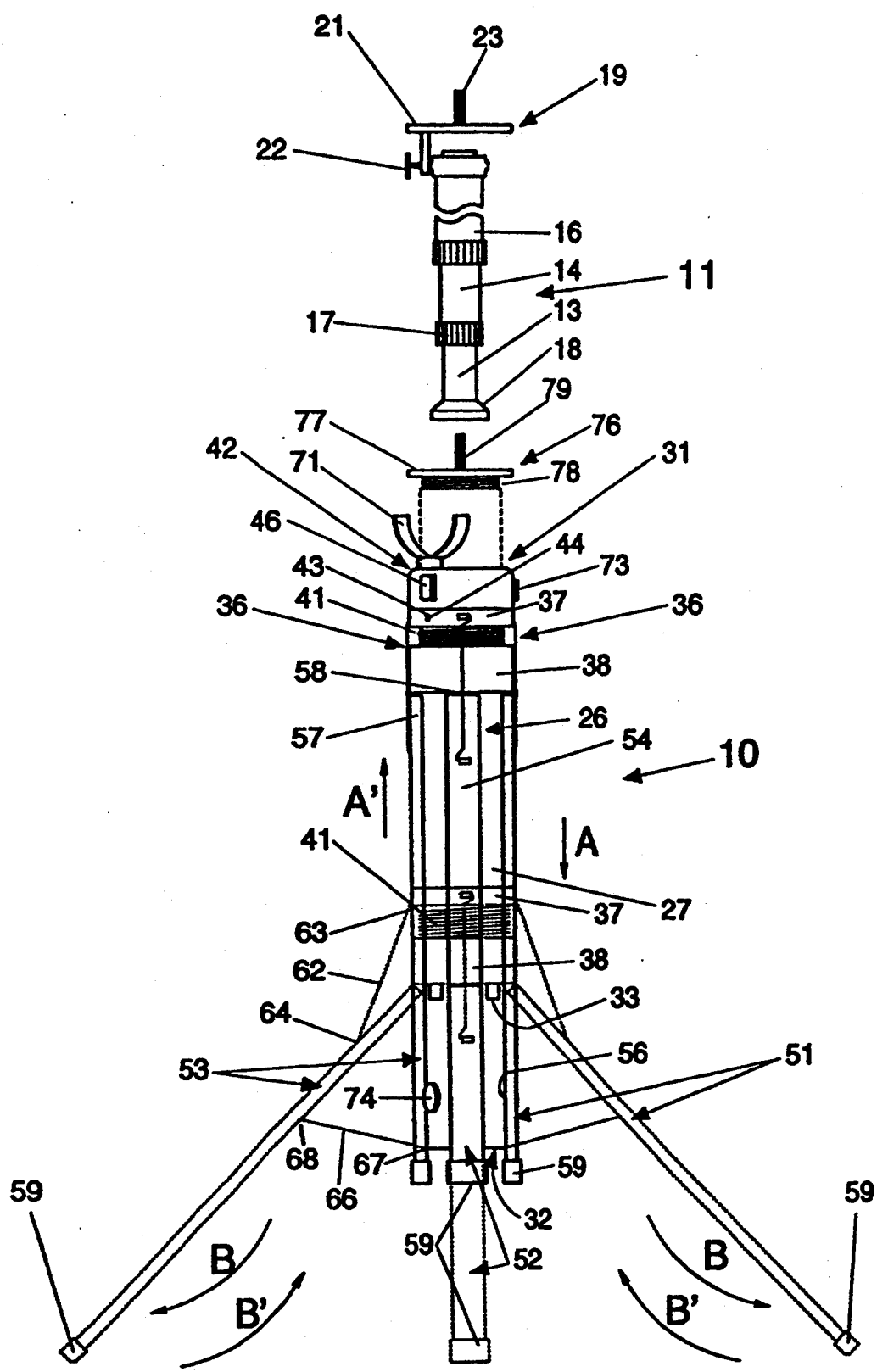
FIG. 1 is a front elevational view of the support stand of the present invention shown with the legs in their spread apart operative position.

Referring now in greater detail to the drawings in which like numerals represent like parts throughout the several views, FIG. 1 illustrates a support stand 10 for supporting optical equipment such as a camera unipod 11. The support stand is further adaptable to support a camera or other photographic equipment. As illustrated, the unipod 11 generally comprises a single leg camera support stand formed from a series of telescoping sections 13, 14, and 16. The telescoping sections 13–16 are extensible for extending the unipod to a desired length or height. Threaded collars 17 are mounted between the sections 13 and 14 and 14 and 16 for fixing the sections at a desired length. A foot 18 is mounted to the free end of the lower section 13 of the unipod for supporting the unipod on a surface.

As FIG. 1 illustrates, an adjustable camera mount 19 is attachable to the free end of the upper section 16 of the unipod. The camera mount 19 includes a mounting plate 21 attached to and spaced above the free end of the upper section 16 by a hand adjustable set screw 22. The set screw enables the mounting plate to be pivoted or tilted with respect to the upper end of the upper section. A mounting post 23 is mounted to an upper surface of the mounting plate 21 for receiving and mounting a camera thereon.

Figure 3:
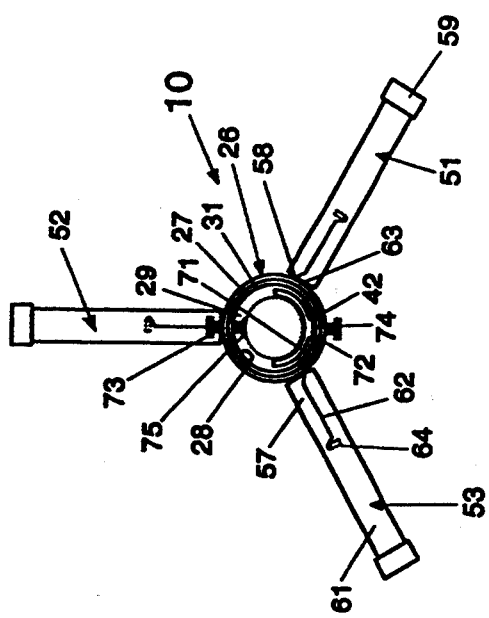
FIG. 3 is a top plan view of the support stand.
Figure 2:
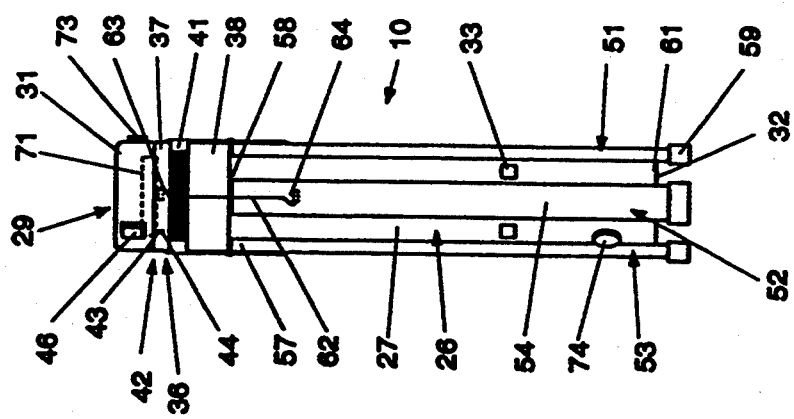
FIG. 2 is a side elevational view of the support stand showing the legs of the support stand in their folded non-operative position.

As shown in FIGS. 1 and 2, the support stand 10 includes a substantially cylindrical stand body 26. The stand body 26 generally is a hollow tube or pipe typically formed from a plastic material such as polyvinylchloride (PVC) or other substantially rigid material. As shown in FIG. 3, the stand body includes an outer side wall 27 and an inner side wall 28 defining a substantially cylindrically shaped bore 29 through the stand body 26. As shown in FIG. 2, the stand body includes an open upper end 31 having a diameter that is slightly greater than the diameter of the outer side wall, and further includes an open lower end 32. A series of substantially square stops or protrusions 33 are formed in the outer side wall 27 of the stand body adjacent the lower end 32. The stops are formed at spaced intervals about the circumference of the outer side wall 27, projecting outwardly therefrom.

A collar means 36 is slidably mounted about the outer side wall 27 of the stand body 26 and is movable along the length thereof between the upper end 31 and the stops 33. The collar means generally includes a first or upper collar 37 that typically is a cylindrical section of pipe or tubing formed from the same substantially rigid plastic material as the stand body. The upper collar has a diameter slightly greater than the diameter of the outer side wall, but less than the diameter of the upper end of the stand body. The larger diameter upper end of the stand body thus acts as a stop or bearing surface to prevent travel of the upper collar 37 past the upper end 31 of the stand body.

A second or lower collar 38 is slidably mounted about the outer side wall 27 of the stand body 26, positioned adjacent the lower end of the upper collar 37. As with the upper collar, the lower collar 38 typically is a cylindrical section of pipe or tubing generally formed from the same rigid plastic material as the stand body and the upper collar. The lower collar has a diameter slightly greater than the diameter of the outer side wall of the stand body. The range of movement of the lower collar 38 along the stand body is limited by the upper collar at the upper end of the stand body and by the stops 33 at the lower end 32 of the stand body.

As shown in FIGS. 1 and 2, a compression spring 41 is slidable mounted about the outer side wall 27 of the stand body 26. The compression spring 41 is positioned between the upper and lower collars 37 and 38. The compression spring acts as a means for moving or biasing the collars along the length of the stand body.

As FIGS. 1, 2, and 3 illustrate, a locking means 42 is formed at the upper end 31 of the stand body 26 for engaging and securing the upper collar at the upper end of the stand body. The locking means 42 typically includes a resilient catch or locking tab 43 mounted within the bore 29 (FIG. 3) of the stand body adjacent the inner side wall 28 thereof. The locking tab 43 projects through the stand body, so as to engage a slot or recess 44 formed within the inwardly facing side wall of the upper collar 37. As the upper collar is urged along the length of the stand body towards the upper end thereof, the locking tab is received within and engages the recess 44 formed in the inner side wall of the upper collar. As a result, the upper collar is locked in position adjacent the upper end of the stand body.

The locking means 42 further includes a release button 46 (FIGS. 1 and 2) formed within the upper end of the stand body, extending through the inner and outer side walls of the stand body. The release button is attached to the locking tab 43, so that as the release button is depressed, the locking tab is urged inwardly and out of the recess 44 formed in the upper collar to release the upper collar.

As FIGS. 1 and 2 illustrate, a series of legs 51, 52, and 53, are mounted in spaced relationship about the circumference of the stand body 26. The legs are generally substantially rectangularly shaped and include a top surface 54 and an underside surface 56. The underside surfaces of the legs have a slight transverse concave curve or bow so as to substantially mate with the curvature of the stand body 26 to enable the legs 51–53 to lie substantially flush against the stand body. Each of the legs are attached at their upper ends 57 to the lower collar 38 by a hinge 58, which enables the legs to pivot outward with respect to the lower collar. Footpads 59 are mounted on the lower ends 61 of the legs 51–53. The footpads 59 generally are formed from rubber, plastic, or a similar non-skid material and typically are weighted for additional stability when engaging the ground or other surface on which the unipod is to be supported.

As indicated in FIG. 1, the legs are movable in response to the sliding movement of the upper and lower collars along the length of the stand body 26. As illustrated in FIG. 1, as the upper and lower collars 37 and 38 are urged downwardly along the length of the stand body in the direction of arrow A, the legs tend to pivot and spread outwardly in the direction of arrows B into an extended operative configuration illustrated in dashed lines in FIG. 1. As the upper and lower collars are urged along the length of the stand body in the direction of arrow A', the legs are retracted toward the stand body in the direction of arrows B' into a compact non-operative configuration as illustrated in FIGS. 1 and 2 for ease of storage and transport.

As illustrated in FIGS. 1, 2, and 3, a first series of struts 62 are pivotally attached at one end 63 to the upper collar 37 and are pivotally attached at their opposite ends 64 to the top surfaces 54 of the legs 51–53. The struts 62 generally are substantially rigid metal wires or straps, although other rigid materials can be used as well. The struts connect the top side surface of each leg to the upper collar so that the upper ends 57 of the legs, and thus the lower collar to which the upper ends of the legs are attached, move with the movement of the upper collar. Further, the connection provided by the struts helps maintain the necessary spring pressure between the upper and lower collars to enable spring loaded extension of the legs when the upper collar is released from its raised, locked position.

Figure 4:
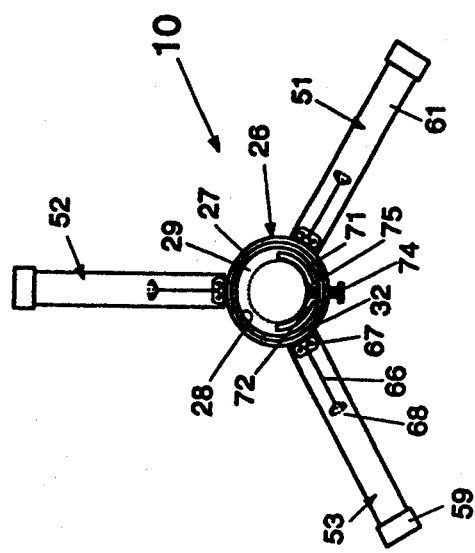
FIG. 4 is a bottom plan view of the support stand.

As shown in FIGS. 1 and 4, a second series of struts 66 are pivotally mounted at one end 67 to the lower end 32 of the stand body 26 and are pivotally attached at their opposite ends 68 to the underside surfaces 56 of the legs 51–53. As with struts 62, the second series of struts 66 are generally formed from substantially rigid metal wires or straps, although other rigid materials can be used as desired. The struts 66 are pivotally connected at each end 67 and 68 to the lower end of the stand body and the underside surface of each leg. As the upper and lower collars are urged along the length of the stand body in the direction of arrows A and A', the second series of struts tend to urge the legs outwardly or inwardly in the direction of arrows B and B', respectively. As a result, the legs are extended or retracted between their operative and non-operative configurations. The rigidity of the first and second series of struts helps maintain the legs in their spread apart configuration, especially as a weight is applied to the stand body, urging the legs further apart.

As FIGS. 1, 3, and 4 illustrate, a yoke 71 is pivotally mounted within the bore 29 of the stand body 26. The yoke typically is a substantially Y-shaped clip formed from a rigid metal or plastic material, and is adapted to slidably engage a section 13, 14, or 16 (FIG. 1) of the unipod 11 as the unipod is inserted into the bore 29 (FIG. 3) of the stand body. The yoke 71 is pivotally attached to the inner side wall 28 of the stand body 26 by a hinge or pivot pin 72. The hinge enables the yoke to pivot upwardly and out of the bore 29 to facilitate the insertion of the foot 18 (FIG. 1) of the unipod 11 into the bore of the stand body. In its lowered position, the yoke frictionally engages the unipod against the inner side wall of the stand body to stabilize the unipod and prevent the unipod from shifting or turning within the bore of the stand body.

A first set screw 73 (FIG. 3) is positioned at the upper end of the stand body, extending through the outer and inner side walls thereof. The first set screw is positioned opposite the yoke 71. As shown in FIGS. 1 and 4, a second set screw 74 is positioned adjacent the lower end 32 of the stand body, aligned with the yoke, and projects through the outer and inner side walls thereof and into the bore 29 (FIG. 4). Typically each set screw will include a snubber 75 attached at their ends inside the base of the stand body. The snubbers generally are formed from a compressible material such as Neoprene, or similar soft rubber material, so that the ends of the set screws will not puncture or otherwise damage the unipod received within the stand body. The set screws can be tightened following insertion of the unipod within the bore of the stand body. As a result, the set screws engage the unipod from opposite sides, holding the unipod against the yoke at the upper end and against the inner side wall at the lower end of the stand body. As a result, the unipod is secured in a stable alignment, fixed against shifting or movement within the support stand 10.

Additionally, as FIG. 1 illustrates, a threaded cap 76 can be attached to the upper end 31 of the stand body 26 for mounting a camera 12 to the upper end of the stand body. The threaded cap 76 includes a base plate 77 from which depends a helically threaded portion 78. The threaded portion 78 is adapted to engage a screw thread (not shown) formed in the inner side wall of the stand body adjacent the upper end thereof to attach the base plate 77 to the upper end of the stand body. A threaded mounting post 79 is attached to the upper surface of the base plate 77, projecting upwardly therefrom. The mounting post is adapted to receive and secure a camera to the base plate 77. As a result, a camera can be mounted directly to the support stand without the use of a unipod. This enables the support stand to be used for supporting a camera or other photographic equipment with the stand positioned on a table top or for use in situations where space is limited or where the use of a unipod is not practical.

Figure 5:
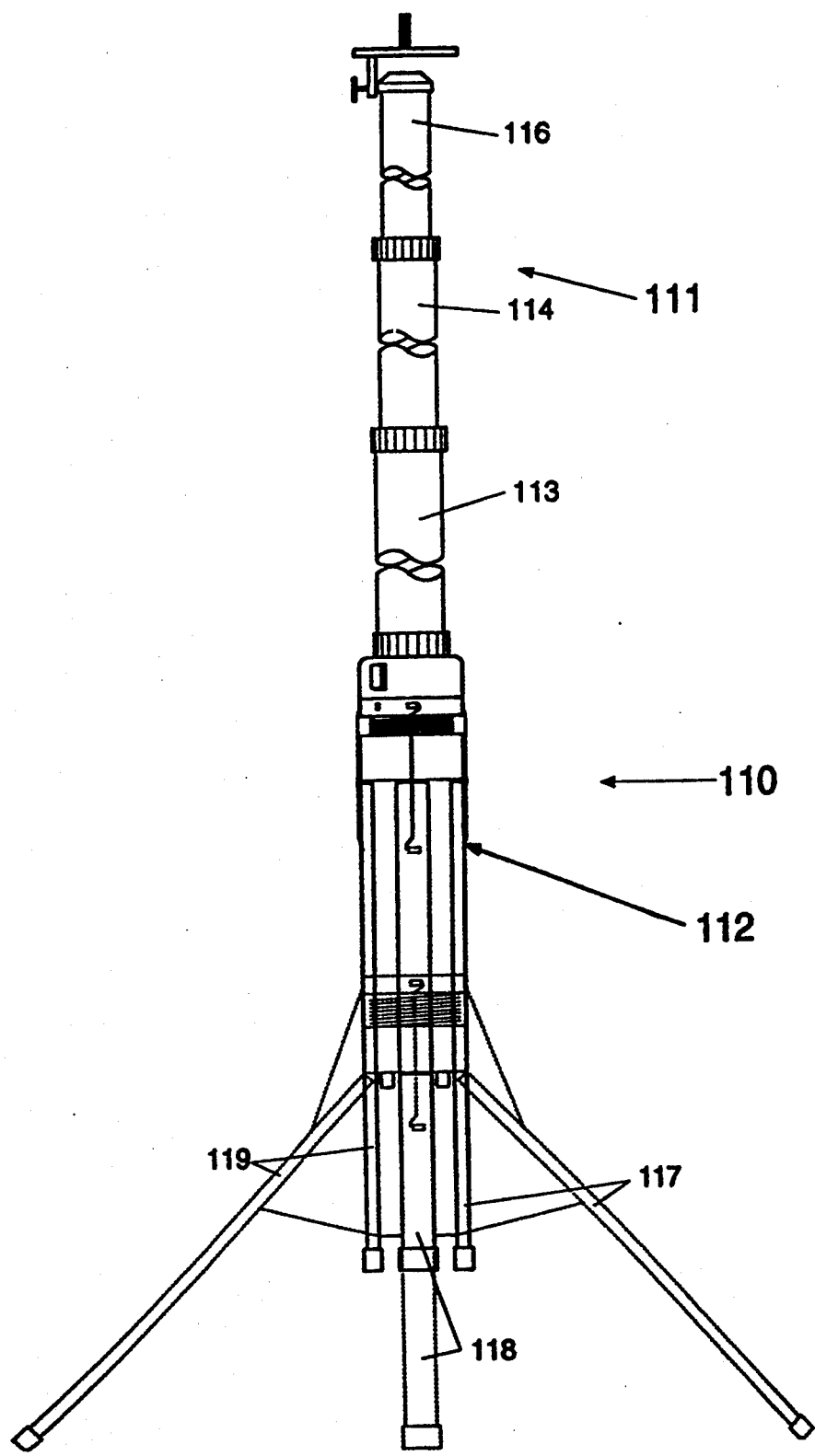
FIG. 5 is a front elevational view of an additional embodiment of the support stand.

FIG. 5 illustrates an additional embodiment of the support stand for supporting optical equipment. In this embodiment, the unipod 111 and the support stand 112 are constructed as a unitary structure with the unipod fixedly mounted to the support stand. As a result, the support stand 110 can function as a unipod with the various sections 113, 114 and 116 of the unipod being telescoped into and out of one another for adjustment of the length of the unipod to a desired height. Additionally, the support stand provides the unipod with spring loaded extensible legs 117, 118 and 119 to provide the unipod with a tripod support structure when so desired. Accordingly the support stand 110 illustrated in FIG. 5 can function as a single leg unipod or can be used as a compact, height adjustable support for optical equipment, having a series of spring loaded legs that are automatically extensible into an extended operative position for supporting the support stand in a stable secure orientation.

OPERATION

As illustrated in FIG. 1, the support stand is typically stored in its retracted, compact non-operative position as illustrated in FIGS. 1 and 2. For supporting a camera unipod 11 (FIG. 1) or similar optical equipment in a stabilized alignment, the user engages the release button 46 mounted at the upper end 31 of the stand body 26 to extend the legs of the support stand to their open, operative position.

The release button disengages a locking tab 43 (FIG. 2) from a recess 44 formed in the upper collar, in response to which the legs are released from their folded, retracted configuration. As shown in FIG. 1, the force exerted on the upper and lower collars by the compression spring once the upper collar is released causes the lower collar to be urged automatically along the length of the stand body in the direction of arrow A. The upper ends 57 of the legs 51, 52, and 53 are likewise urged downwardly in the direction of arrows A by the movement of the lower collar along the length of the stand body. Struts 62 attaching the upper collar to the top surfaces of the legs cause the upper collars to likewise be pulled along the length of the stand body with the movement of the lower collar. A series of struts 66 mounted between the underside surfaces 56 of the legs and the lower end 32 of the stand body restrict the downward movement of the intermediate portions of the legs, causing the legs to swing or spread outwardly as the legs are urged downwardly in the direction of arrows B into a fully extended operative position indicated in dashed lines in FIG. 1.

With the legs of the support stand extended outwardly in their operative position, the support stand is positioned on the ground or other surface. The footpads 59 at the ends of the legs engage the ground surface to prevent shifting or slippage of the support stand. Yoke 71 is pivoted upwardly and out of the upper end of the bore of the stand body for receipt of the unipod 11 therein. The removal of the yoke from the bore enables the foot 18 of the unipod to pass through the open upper end of the stand body without interference.

Prior to insertion into the support stand 10, the unipod generally can be adjusted to a desired height or length. As shown in FIG. 1, the unipod is thereafter inserted end foot first into the bore of the stand body. Following the insertion of the foot of the unipod into the bore, the yoke is pivoted into the bore of the stand body into engagement with the body of the unipod. The yoke engages the unipod, holding the unipod against the inner side wall of the stand body. Set screws 73 (FIG. 3) and 74 (FIG. 4) are thereafter tightened into engagement with the body of the unipod contained within the bore of the support stand. The set screws engage the unipod body against the inner side wall of the bore of the support stand to secure the unipod in a fixed orientation against shifting or twisting movement. The mounting of only a portion of the unipod within the bore of the stand body by the yoke provides secure, stable support to the unipod and also enables adjustment of the height or length of the unipod while the unipod is mounted within the support stand for easy adjustment of the unipod as desired. A camera 12 (FIG. 1) can thereafter be mounted on the unipod for taking photographs.

After use, the set screws are loosened, releasing the unipod body from engagement therewith, and the unipod is raised out of the bore of the support stand. The threaded collars between the unipod sections are loosened and the sections of the unipod are thereafter telescoped into one another to retract the unipod into a compact configuration for easy transport and storage.

To retract the legs of the support stand into their non-operative position (shown in FIG. 2), the upper collar is urged along the length of the stand body in the direction of arrow A' toward the upper end of the stand body until the upper end is engaged by the upper collar. As the upper collar is urged against the upper end of the stand body, the locking tab engages the locking recess formed in the upper collar to secure the upper collar adjacent the upper end of the stand body.

The struts 62 attached to the upper collar and the legs adjacent the upper ends 57 thereof cause the upper ends of the legs to be urged upwardly with the movement of the upper collar. At the same time, the struts 66 cause the intermediate portions of the legs tend to move inwardly in the direction of arrows B' into a folded nonoperative configuration lying flat against the stand body, as shown in FIGS. 1 and 2. The upward movement of the upper ends of the legs also causes the lower collar to be urged and held tightly against the bottom of the upper collar, with the spring 41 compressed therebetween.

Thus the support stand can quickly and easily be retracted into a compact configuration for ease of storage and transport. The compression of the spring with the collars in their locked position adjacent the upper end of the stand body also provides for spring loaded extension of the legs of the support stand for quick and easy assembly thereof.

It will be understood by those skilled in the art that while the present invention has been disclosed with reference to the support of a camera unipod, the present invention also can be used for supporting a variety of different types of optical equipment such as a surveyor's sextant and other equipment and is not limited solely for use in supporting a camera unipod.

The features and principles of the present invention have been illustrated in the foregoing description of a preferred embodiment thereof. It will be understood by those skilled in the art that numerous changes or modifications may be made thereto without departure from the spirit and scope of the invention.

I claim:

1. Apparatus for supporting a unipod, comprising:
   a stand body having a lower end and an open upper end and a bore defined therethrough between said upper and lower ends, adapted to receive and secure a portion of the unipod within said stand body;
   said stand body further including means for securing the unipod within said bore in a contacting, frictionally engaging relationship with said stand body for supporting the camera unipod while still enabling longitudinal adjustment of the unipod as desired, said means mounted along said bore of said stand body adjacent said open upper end thereof and movable into and out of engagement with the unipod to facilitate insertion of the unipod into said bore;
   collar means mounted about said stand body below said upper end thereof and slidably movable along the length of said stand body;
   a plurality of leg members hingedly mounted to said collar means and adapted to move with the movement of said collar means between a folded nonoperative alignment positioned adjacent said stand body and an unfolded operative alignment spaced from said stand body for supporting said stand body; and
   means for moving said collar means along said stand body, said means for moving said collar means positioned between said collar means and slidably mounted along said stand body so as to be movable along said stand body with said collar means.

2. The apparatus of claim 1 and wherein said collar means comprises a first collar slidably mounted along said stand body and attached to said leg members by struts, and a second collar slidably mounted along said stand body and movable therealong with the movement of said first collar and hingedly attached to an upper end of each of said legs for causing said legs to move between their operative and non-operative positions.

3. The apparatus of claim 2 and further including stops formed in said stand body adjacent said lower end thereof, positioned to engage and prevent movement of said second collar off of said lower end of said stand body.

4. The apparatus of claim 1 and wherein said means for securing the unipod within said stand body comprises a semicylindrical yoke hingedly mounted within said stand body adjacent said upper end thereof so as to be movable into contact with the portion of the unipod as the unipod is received within said stand body.

5. The apparatus of claim 1 and further comprising a mounting bracket having a base plate with a threaded portion depending therefrom and adapted to engage and threadably attach to said upper end of said stand body, and a mounting post attached to an upper surface of said cylindrical portion for mounting a camera to said stand body.

6. The apparatus of claim 2 and wherein said means for moving said collar means comprises a compression spring mounted between said first and second collars.

7. A support stand for supporting optical equipment in a stable orientation secured against undue movement, said support stand comprising:
   a stand body having a lower end and an upper end and a bore extending longitudinally therethrough for receiving and supporting optical equipment within said stand body;
   upper and lower collars mounted about said stand body and movable therealong;
   legs attached at one end to said lower collar, with said ends of said legs movable along said stand body with the movement of said lower collar, and with said legs further connected along their length to said upper collar and to said lower end of said stand body such that as said upper and lower collars are moved along said stand body, said legs are caused to move between a spread apart operative position and a retracted non-operative position; and
   means for securing the optical equipment within said stand body positioned along the length of said bore of said stand body and adapted to be movable into and out of engaging frictional contact with the optical equipment to facilitate the receipt of the optical equipment within said stand body.

8. The support stand of claim 7 and further including stops formed along said stand body adjacent said lower end thereof, positioned to engage and prevent movement of said lower collar off of said lower end of said stand body.

9. The support stand of claim 7 and further comprising a mounting bracket having a base plate with a threaded portion depending therefrom and adapted to engage and threadably attach to said upper end of said stand body, and a mounting post attached to an upper surface of said cylindrical portion for mounting a camera to said stand body.

10. The support stand of claim 7 and further comprising a spring slidably mounted on said stand body between said upper and lower collars for causing said collars to move along said stand body.

11. The support stand of claim 7 and wherein said means for securing the unipod within said stand body comprises a semicylindrical yoke hingedly mounted within said stand body adjacent said upper end thereof and adapted to be movable into frictional contact with the portion of the optical equipment received Within said stand body.

12. A camera support stand comprising:
    a stand body having an upper end and a lower end;
    a series of legs hingedly mounted about said stand body and movable along said stand body and movable between a folded nonoperative configuration and a spread apart operative configuration as said legs are moved along said stand body;
    a unipod support for a camera mounted within said stand body extending outwardly from said upper end of said stand body and having a plurality of telescoping sections for adjusting the length thereof with respect to said stand body for adjusting the height of the camera mounted thereon;
    means for mounting a camera on said unipod attached to an upper end of said unipod; and
    means for moving said legs along said stand body, comprising a first collar slidably mounted on said stand body and attached to said legs, and a second collar slidably mounted along said stand body and hingedly attached to an upper end of each of said legs, and a means for urging said collars along said stand body, mounted between said collars, for urging said legs to move between their operative and nonoperative configurations.

13. The camera support of claim 12 and further including struts formed in said stand body adjacent said lower end thereof, positioned to engage and retard movement of said means for moving said legs of said lower end.

* * * * *